United States Patent
Choochotkaew et al.

(10) Patent No.: US 11,842,214 B2
(45) Date of Patent: Dec. 12, 2023

(54) FULL-DIMENSIONAL SCHEDULING AND SCALING FOR MICROSERVICE APPLICATIONS

(71) Applicant: INTERNATIONAL BUSINESS MACHINES CORPORATION, Armonk, NY (US)

(72) Inventors: Sunyanan Choochotkaew, Koto (JP); Tatsuhiro Chiba, Bunkyo-ku (JP)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 492 days.

(21) Appl. No.: 17/218,596

(22) Filed: Mar. 31, 2021

(65) Prior Publication Data

US 2022/0318060 A1    Oct. 6, 2022

(51) Int. Cl.
*G06F 9/54* (2006.01)
*G06F 9/50* (2006.01)
*G06N 5/02* (2023.01)

(52) U.S. Cl.
CPC ............ *G06F 9/5005* (2013.01); *G06F 9/542* (2013.01); *G06N 5/02* (2013.01)

(58) Field of Classification Search
None
See application file for complete search history.

(56) References Cited

U.S. PATENT DOCUMENTS

| 9,329,904 B2 | 5/2016 | Wray et al. |
| 2018/0254996 A1 | 9/2018 | Kairali et al. |
| 2020/0136987 A1 | 4/2020 | Nakfour |

(Continued)

FOREIGN PATENT DOCUMENTS

| CN | 109144724 A | 1/2019 |
| CN | 111045820 A | 4/2020 |

(Continued)

OTHER PUBLICATIONS

UK Government, "Multi-criteria analysis: a manual", WWW.Communities.gov.uk. Department for Communities and Local Government Publications: London. ISBN: 978-1-4098-1023-0. Jan. 2009. pp. 1-168.

(Continued)

*Primary Examiner* — Craig C Dorais
(74) *Attorney, Agent, or Firm* — Tutunjian & Bitetto, P.C.; Robert Richard Aragona

(57) ABSTRACT

A computer-implemented method for scheduling and scaling a cloud system for microservice applications is provided including identifying a plurality of nodes within one or more clusters associated with a plurality of containers, generating a model for predicting resource usage among the plurality of nodes, automatically deciding on a number of replicated containers, node bindings, and weight for each replicated container according to application requests and current usage status of a cluster of the one or more clusters that reduce resource usages and microservice cohesion, and determining at least node redistribution of the plurality of nodes within the plurality of containers and workload partitioning to reconfigure scaling, scheduling, and balance deployment requirements of the microservice applications.

20 Claims, 11 Drawing Sheets

(56) References Cited

U.S. PATENT DOCUMENTS

| | | |
|---|---|---|
| 2020/0159630 A1 | 5/2020 | Chen |
| 2020/0195526 A1 | 6/2020 | Eberlein et al. |
| 2021/0157655 A1* | 5/2021 | Foreman ............... G06F 9/5077 |
| 2022/0147517 A1* | 5/2022 | Rupprecht .............. G06F 16/11 |

FOREIGN PATENT DOCUMENTS

| | | | |
|---|---|---|---|
| CN | 111459681 A | 7/2020 | |
| WO | WO-2018174897 A1 * | 9/2018 | ......... G06F 9/45558 |

OTHER PUBLICATIONS

Rzadca et al., "Autopilot: workload autoscaling at Google", EuroSys '20: Proceedings of the Fifteenth European Conference on Computer Systems. Apr. 27-30, 2020. https://dl.acm.org/doi/10.1145/3342195.3387524. pp. 1-16.

Mell et al., "The NIST Definition of Cloud Computing", National Institute of Standards and Technology, Special Publication 800-145, Sep. 2011. pp. 1-7.

\* cited by examiner

FULL-DIMENSIONAL SCHEDULING AND SCALING FOR MICROSERVICE APPLICATIONS

BACKGROUND

The present invention relates generally to microservices (μservice), and more specifically, to a method for full-dimensional scheduling and scaling for μservice applications.

Employing micro-services allows breaking down complex applications into relatively simple independent processes, thus producing highly decoupled systems. Each system may include multiple applications that are hosted on a provider's infrastructure. Each process associated with the services is focused on doing a relatively simple task to support the applications for each individual customer.

SUMMARY

In accordance with an embodiment, a computer-implemented method for scheduling and scaling a cloud system for μservice applications is provided. The computer-implemented method includes identifying a plurality of nodes within one or more clusters associated with a plurality of containers, generating a model for predicting resource usage among the plurality of nodes, automatically deciding on a number of replicated containers, node bindings, and weight for each replicated container according to application requests and current usage status of a cluster of the one or more clusters that reduce resource usages and μservice cohesion, and determining at least node redistribution of the plurality of nodes within the plurality of containers and workload partitioning to reconfigure scaling, scheduling, and balance deployment requirements of the microservice applications.

In accordance with another embodiment, a computer program product for scheduling and scaling a cloud system for μservice applications is provided. The computer program product includes a computer readable storage medium having program instructions embodied therewith, the program instructions executable by a computer to cause the computer to identify a plurality of nodes within one or more clusters associated with a plurality of containers, generate a model for predicting resource usage among the plurality of nodes, automatically decide on a number of replicated containers, node bindings, and weight for each replicated container according to application requests and current usage status of a cluster of the one or more clusters that reduce resource usages and μservice cohesion, and determine at least node redistribution of the plurality of nodes within the plurality of containers and workload partitioning to reconfigure scaling, scheduling, and balance deployment requirements of the microservice applications.

In accordance with yet another embodiment, a system for scheduling and scaling a cloud system for μservice applications is provided. The system includes a memory and one or more processors in communication with the memory configured to identify a plurality of nodes within one or more clusters associated with a plurality of containers, generate a model for predicting resource usage among the plurality of nodes, automatically decide on a number of replicated containers, node bindings, and weight for each replicated container according to application requests and current usage status of a cluster of the one or more clusters that reduce resource usages and μservice cohesion, and determine at least node redistribution of the plurality of nodes within the plurality of containers and workload partitioning to reconfigure scaling, scheduling, and balance deployment requirements of the microservice applications.

It should be noted that the exemplary embodiments are described with reference to different subject-matters. In particular, some embodiments are described with reference to method type claims whereas other embodiments have been described with reference to apparatus type claims. However, a person skilled in the art will gather from the above and the following description that, unless otherwise notified, in addition to any combination of features belonging to one type of subject-matter, also any combination between features relating to different subject-matters, in particular, between features of the method type claims, and features of the apparatus type claims, is considered as to be described within this document.

These and other features and advantages will become apparent from the following detailed description of illustrative embodiments thereof, which is to be read in connection with the accompanying drawings.

BRIEF DESCRIPTION OF THE DRAWINGS

The invention will provide details in the following description of preferred embodiments with reference to the following figures wherein.

Throughout the drawings, same or similar reference numerals represent the same or similar elements.

DETAILED DESCRIPTION

Figure 1:
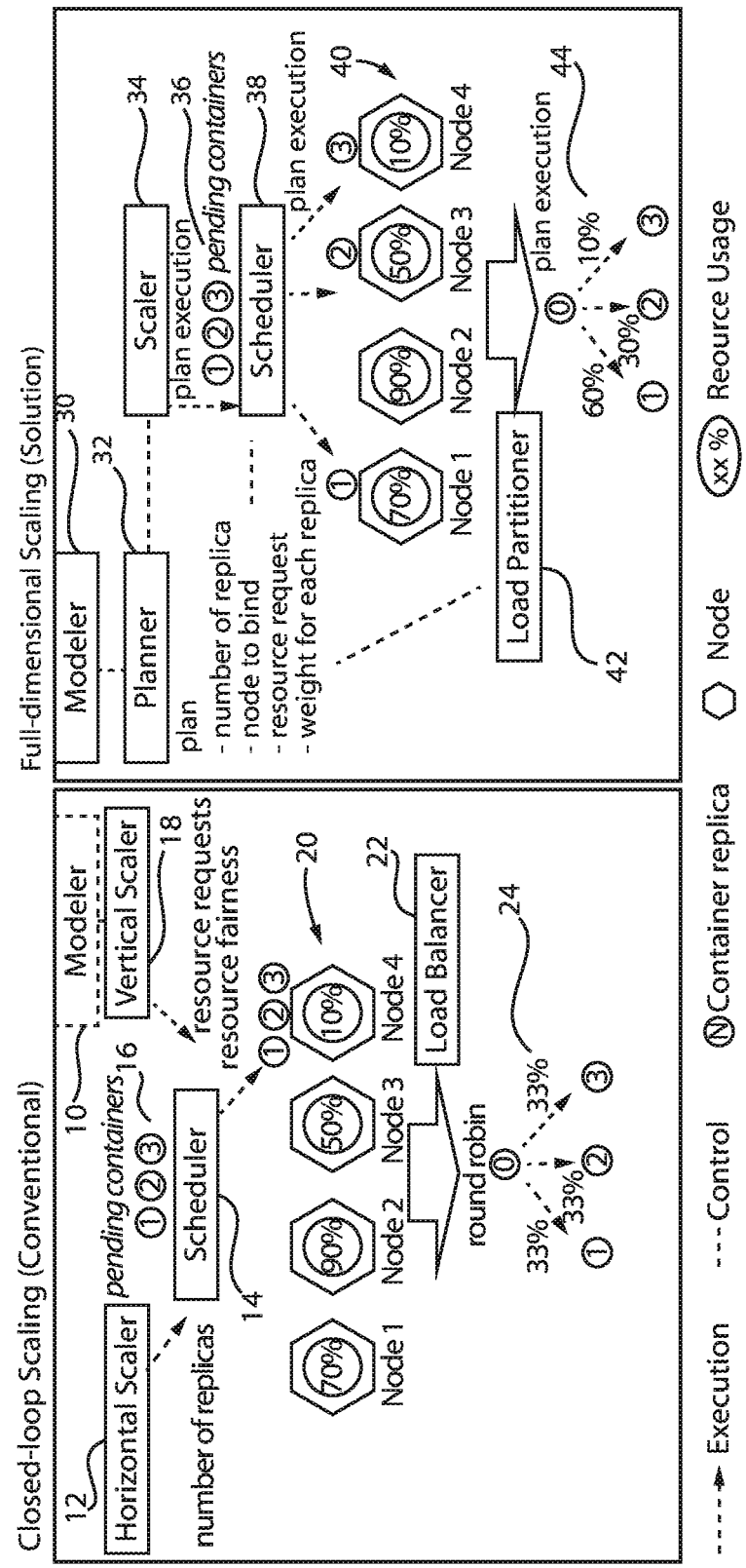
FIG. 1 shows an exemplary full-dimensional scaling system versus a conventional scheduling and scaling system, in accordance with an embodiment of the present invention.

Embodiments in accordance with the present invention provide methods and devices for automatically deploying µServices (or microservices) with best performance with regards to scaling, scheduling, and load balance. Microservices or µServices, also known as a microservice architecture, is an architectural style that structures an application as a collection of services that are highly maintainable and testable, loosely coupled, independently deployable, organized around business capabilities, and owned by a small team. The microservice architecture enables the rapid, frequent and reliable delivery of large, complex applications.

Many types of public and private Cloud systems require their users to declare how many instances their workload will need during execution, and the resources needed. In public Cloud platforms, users need to choose the type and the number of virtual machines (VMs) they will rent, whereas in a Kubernetes cluster, users set the number of Pod replicas and resource limits for individual Pods. In Google, users are asked to specify the number of containers they need and the resource limits for each. Such limits make cloud computing possible, by enabling the Cloud infrastructure to provide adequate performance isolation.

But limits are a nuisance to users. It can be difficult to estimate how many resources a job needs to run optimally. The right combination of central processing unit (CPU) power, memory, and the number of concurrently running replicas can be difficult to determine. Load tests can help find an initial estimate, but these recommendations become stale as resource needs change over time because many end-user serving jobs have diurnal or weekly load patterns, and traffic changes across longer time scales as a service becomes more or less popular. Finally, the resources needed to handle a given load vary with new features, optimizations and updates of the underlying software or hardware stack. Exceeding the requested resources can result in poor performance if the CPU is capped, or cause a task to be killed because it runs out of memory.

Thus, in many public and private Cloud systems, users need to specify a limit for the amount of resources (e.g., CPU cores and random access memory (RAM)) to provision for their workloads. A job that exceeds its limits might be throttled or killed, resulting in delaying or dropping end-user requests, so human operators naturally err on the side of caution and request a larger limit than the job needs. At scale, this results in massive aggregate resource wastage and poor utilization of physical resources.

The exemplary embodiments of the present invention address such resource wastage issues by generating a model for predicting resource usage, which involves building a clustering model to cluster any arbitrary containers into predefined groups based on container behaviors of normal load and resource usage, for each cluster, building a regression model to predict resource usage from node-independent load and node occupied status (e.g., summation of resources used by other containers in the same node) beforehand. The exemplary embodiments of the present invention further automatically decide on the number of replicated containers, node bindings, and weights for each replicated container according to application requests and current usage status of clusters that minimize resource usage and µservice-cohesion. The exemplary embodiments of the present invention further implement scaling, scheduling, and balance deployment complying to the decision from the deciding step.

The exemplary embodiments of the present invention further employ logic to combine vertical and horizontal scaling, placement scheduling, and load balancing decisions (full dimensions) together with a supportive integration framework. A cluster-based resource usage model is employed reflecting different behaviors of arbitrary microservices on dynamic cluster usage status (e.g., no service-node-dependent profiling requirement). A cohesion metric is further employed that is a summation of partitioned workload weighted with each microservice-pair communication integrated to optimized objectives. A routing-based workload partitioning methodology can also be employed.

It is to be understood that the present invention will be described in terms of a given illustrative architecture; however, other architectures, structures, substrate materials and process features and steps/blocks can be varied within the scope of the present invention. It should be noted that certain features cannot be shown in all figures for the sake of clarity. This is not intended to be interpreted as a limitation of any particular embodiment, or illustration, or scope of the claims.

FIG. 1 shows an exemplary full-dimensional scaling system versus a conventional scheduling and scaling system, in accordance with an embodiment of the present invention.

Microservices or µServices are independent components of a software or computer system application that runs on a computer system or environment, e.g., on a computing device, a server, or other similar computing systems. Each microservice may be independently deployed, scaled, and maintained. Because each microservice may be independently deployed, the development of each microservice may be parallelized across multiple teams. Microservices are often used as plug and play components to provide new services in a cloud based environment. As demand for each microservice increases or decreases, the resources, e.g., processors, memory, bandwidth, etc., assigned to that microservice may also be increased or decreased as needed to meet the demand. This increase or decrease, sometimes referred to as auto scaling, is often performed automatically in response to the increase or decrease in demand so that only the required amount of computer resource capacity, e.g., processors, memory, bandwidth, etc., is allocated to the microservice.

Therefore, µServices are application designs with multiple loosely-coupling services communicating to each other via message passing protocols to serve a common goal to clients and scaling is a mechanism to increase or decrease resources for services that can be performed in two dimensions that are duplication/replicas (horizontal) and CPU/memory provisions (vertical) provided by, e.g., a cloud orchestrator. Further, traffic routing is the ability to control the load traffic to each replicated container depending on specified rules performed by service-mesh operator (e.g., Istio).

Referring back to FIG. 1, for the conventional closed-loop scaling, a resource usage modeler 10 collects resource usage data/information. The modeler 10 communicates with a horizontal autoscaler 12, a vertical autoscaler 18, and a scheduler 14 for scheduling pending containers 16.

A cluster autoscaler automatically resizes cluster node pools based on demands of the workload. When demand is high, the cluster autoscaler adds nodes to the node pool. When demand is low, the cluster autoscaler scales back down to a minimum size that can be designated. This can increase the availability of the workloads as needed, while controlling costs. The horizontal autoscaler 12 changes the shape of the workload by automatically increasing or decreasing the number of Pods in response to the workload's CPU or memory consumption, or in response to custom metrics reported from within the workload or external metrics from sources outside of the cluster. It's not always easy to predict the indicators that show whether the workload is under-resourced or under-utilized. The horizontal autoscaler 12, however, can automatically scale the number of Pods in the workload based on one or more metrics of the following types, that is, actual resource usage, custom metrics, and external metrics. The vertical autoscaler 18 can recommend values for CPU and memory requests and limits, or the vertical autoscaler 18 can automatically update the values.

The cluster scheduler 16 has multiple goals, such as, using the cluster's resources efficiently, working with user-supplied placement constraints, scheduling applications rapidly to not let them in a pending state, having a degree of "fairness," being robust to errors and always available.

Containers are an alternative to virtual machines for helping developers to build, ship, deploy, and instantiate applications. A container is a set of processes that are isolated from the rest of the machine encapsulating its dependencies. Containers run in isolation, sharing an operating system (OS) instance. Containers do not need an entire guest operating system, making containers lighter by an order of magnitude compared to virtual machines. As containers can start in a matter of seconds, more quickly than virtual machines, containers are made to take a limited amount of resources (e.g., less than 2 GB of RAM) and scale to satisfy the demand. Containers are often used in microservices architectures where each container represents a service, connected to the other services through the network. This microservice architecture allows each component to be deployed and scaled independently of the others.

The main task of a container scheduler 16 is to start containers on the most appropriate host and connect them together. Container scheduler 16 must handle failures by doing automatic fail-overs and container scheduler 16 needs to be able to scale containers when there is too much data to process or compute for a single instance.

The nodes 20 include a first node with a resource usage of 70%, a second node with a resource usage of 90%, a third node with a resource usage of 50%, and a fourth node with a resource usage of 10%. A load balancer 22 can be employed to balance the nodes via, e.g., a round robin approach 24, where each container replica handles 33% of the load.

In contrast, in the full-dimensional scaling approach of the exemplary embodiments of the present invention (right-hand side), the modeler 30 communicates with a planner 32. The planner 32 creates a plan for the number of replicated containers, the nodes to bind, resource usage requests, and a weight for each replica container. The planner 32 communicates with a scaler 34 and sends the pending containers 36 to the scheduler 38. The scheduler 38 distributes the containers 36 to different nodes 40 (as opposed to the same node as in the conventional closed-loop scaling configuration). Thus, the first node handles container 1, the third node handles container 2, and the fourth node handles container 3. As a result, via the load partitioner 42, the distribution mechanism 44 distributes the load as follows: container 1 handles 60% of the resource usage, container 3 handles 30% of the resource usage, and container 3 handles 10% of the resource usage. As a result, one node (e.g., node 4 of the conventional system) does not handle all the containers 36. Instead, multiple nodes share the load of containers 36. The workload is thus partitioned between multiple nodes.

Therefore, according to the exemplary embodiments of the present invention, a model is generated for predicting resource usage. The exemplary methods build a clustering model to cluster any arbitrary containers into predefined groups based on their behaviors of normal load and resource usage. For each cluster, the exemplary methods build a regression model to predict resource usage from node-independent load and node occupied status (e.g., summation of resources used by other containers in the same node) beforehand. Next, the exemplary methods automatically decide on the number of replicated containers, node bindings, and weight for each replica container according to application requests and current usage status of a cluster that minimizes resource usage and μservice-cohesion. Finally, the exemplary methods scale, schedule, and balance deployment to comply with the previous decision.

A deployment provides declarative updates for Pods and ReplicaSets. A deployment's primary purpose is to declare how many replicas of a Pod should be running at a time. When a deployment is added to the cluster, it will automatically spin up the requested number of Pods, and then monitor them. If a Pod dies, the deployment will automatically re-create it. Pods are the smallest deployable units of computing that can be created and managed in Kubernetes. A Pod is a group of one or more containers, with shared storage and network resources, and a specification for how to run the containers. A Pod's contents are always co-located and co-scheduled, and run in a shared context. A Pod models an application-specific "logical host," that is, it includes one or more application containers which are relatively tightly coupled. A workload is an application running on Kubernetes. Whether the workload is a single component or several that work together, on Kubernetes workloads run inside a set of pods. Kubernetes is a portable, extensible, open-source platform for managing containerized workloads and services, that facilitates both declarative configuration and automation. A Kubernetes cluster includes the components that represent the control plane and a set of machines referred to as nodes. A node may be a virtual or physical machine, depending on the cluster. Each node is managed by the control plane and includes the services necessary to run Pods.

A deployment can be defined to create a ReplicaSet or to remove deployments and adopt all their resources with new deployments. When a deployment is revised, a ReplicaSet is created that describes the state that desired. During a rollout, the deployment controller changes the actual state to the state desired at a controlled rate. Each deployment revision can also be rolled back. Deployments can also be scaled. A ReplicaSet is a set of Pod templates that describes a set of Pod replicas. ReplicaSet uses a template that describes what each Pod must include. The ReplicaSet ensures that a specified number of Pod replicas are running at any time.

Consequently, the exemplary methods relate to a logic to combine vertical and horizontal scaling, placement scheduling, and load balancing decisions (full dimensions) together with a supportive integration framework. The exemplary methods employ a cluster-based resource usage model reflecting different behaviors of arbitrary microservices on dynamic cluster's usage status (e.g., no service-node-dependent profiling requirement). A cohesion metric is introduced that is a summation of partitioned workloads weighted with each microservice-pair communication integrated to optimized objectives. Finally, in the exemplary methods, a routing-based workload partitioning methodology is presented.

Regarding resource usage modeling (online or offline), the exemplary methods first collect resource usage and node-independent workload metrics (e.g., message requests), resource usage regarding containers and deployed nodes. Then, the exemplary methods cluster all collected items into a specific number of groups featured by standardized workload and resource usage. The exemplary methods subsequently find the best-performing regression model featured by occupied status of deployed nodes, and node-independent workloads to predict target resource usage for each group.

Regarding full-dimensional planning, and specifically with respect to planning output, the following parameters are defined, binding set (B), corresponding partitioned workload set (P), and corresponding usage reservation (U). With respect to trigger events, and specifically with regard to a new deployment request with application specification, the following parameters are defined, target microservices (T), service dependency (W), normal behaviors on usage and workload ($R_0$, $L_0$). Additionally, the term reconcile timeout with application specification and current deployment decision is defined as ($B^{-1}, P^{-1}, U^{-1}$).

Regarding planning logic, and in particular to gathering information, the exemplary methods create a group map ($G_{map}$) and a load map ($L_{map}$) to map each microservice to a clustered group and expected load from measured features or normal behaviors for the initial deployment. Then, the exemplary methods validate previous decisions and try scaling down focus on already-deployed containers. The validation further includes sorting and migrating those from workload minimum orders to the deployed nodes with maximum workload until it breaks the node capacity constraints. The validation further includes re-predicting usage from the above-stated model for every new binding set and pre-setting the valid and merged solution and updating the most demanding microservices. Finally, the exemplary embodiments find a solution to minimize weighted and normalized values of the following metrics. The defined parameters include the number of replica |B|, which is the count value of replicated containers from binding decision and the microservice cohesion W[B,P], which is a service dependency weight (W) between each microservice pair on the same node in binding set multiplied by the partitioned workload.

Regarding plan execution, the exemplary methods patch the replica-set controller for resources according to B and U, bind scheduled containers and nodes according to B, and leverage routing mechanisms for workload partitioning according to P. The leveraging further includes labeling containers with assigned nodes, creating routing destination rules mapping subsets to the label, and creating routing virtual services to route traffic of microservices.

Figure 2:
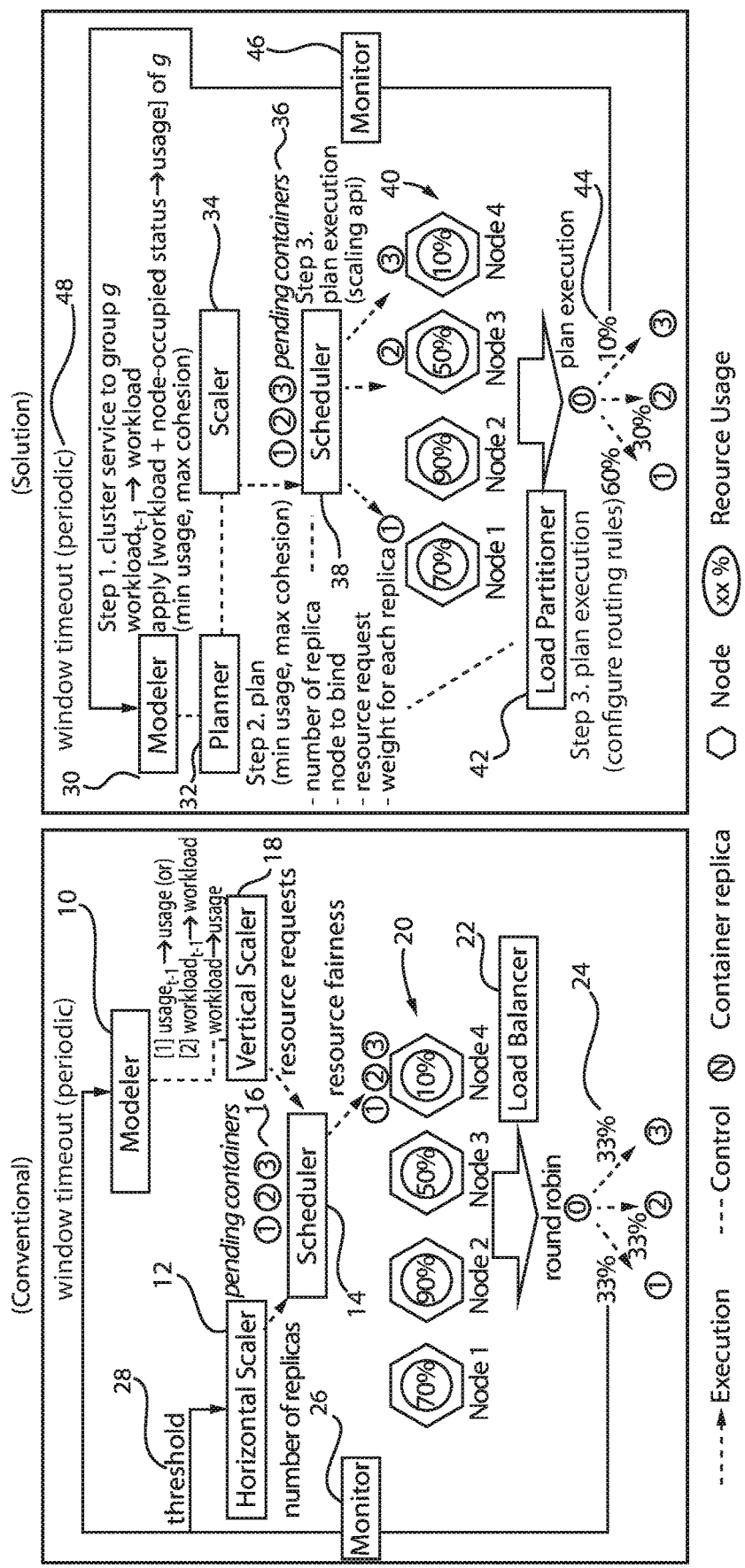
FIG. 2 is an exemplary full-dimensional scaling system versus a conventional scheduling and scaling system with a monitor component, in accordance with an embodiment of the present invention.

FIG. 2 is an exemplary full-dimensional scaling system versus a conventional scheduling and scaling system with a monitor component, in accordance with an embodiment of the present invention.

The full-dimensional scaling system of FIG. 2 is similar to the full-dimensional scaling system of FIG. 1. However, the full-dimensional scaling system of FIG. 2 includes a monitor component. In particular, the conventional system (left-hand side) includes a monitor 26 that receives the output 24 from a round robin approach. The monitor 26 provides feedback to the modeler 10, where the output of the monitor 26 is compared to a threshold 28 before being fed back into the horizontal autoscaler 12.

In the full-dimensional scaling system of the exemplary embodiments (right-hand side), the monitor 46 receives the output 44 from the exemplary load partitioning methodology. The monitor 46 provides feedback to the modeler 30. A window timeout 48 is also illustrated.

Figure 3:
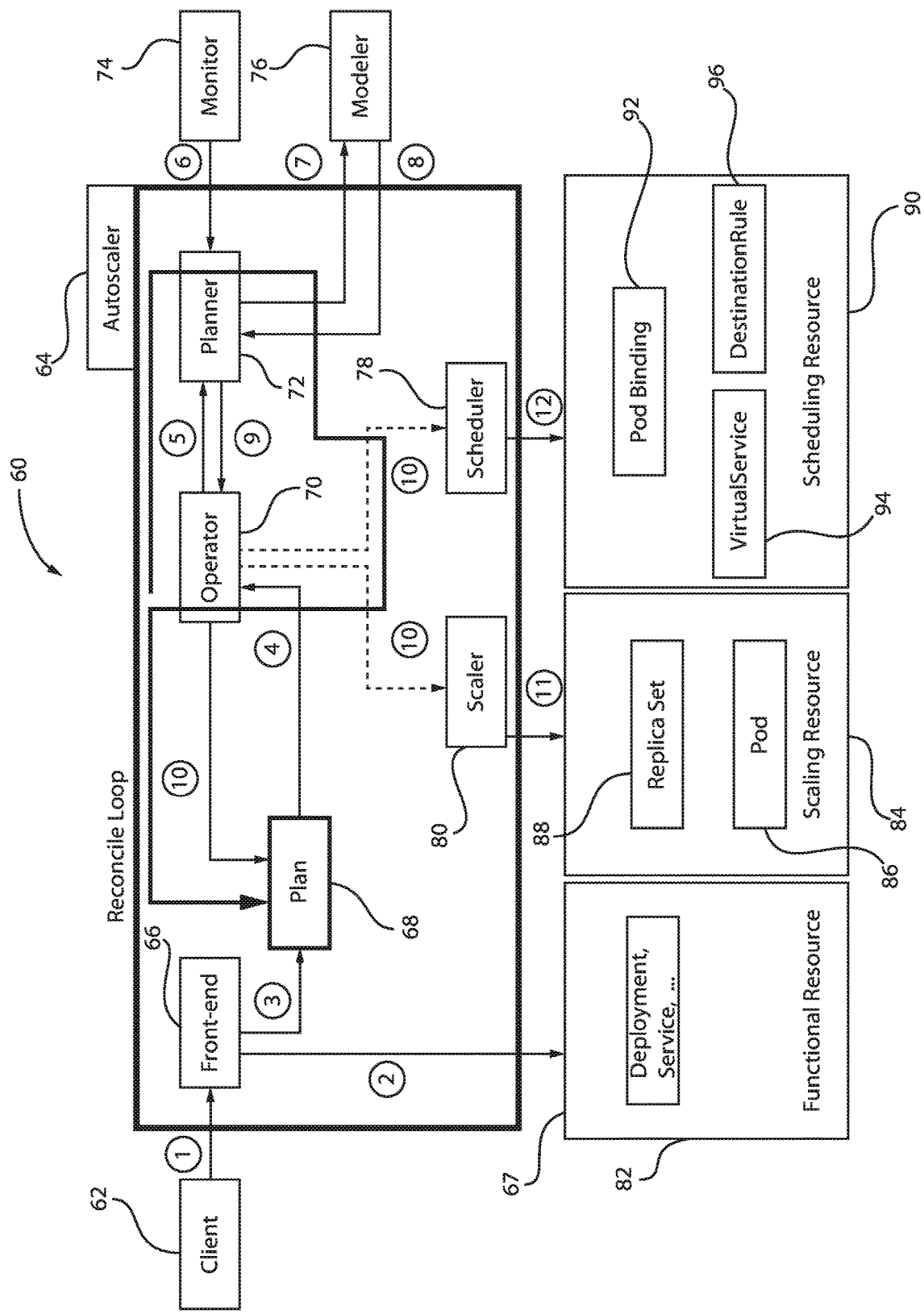
FIG. 3 is a block/flow diagram of an exemplary full-dimensional scaling system with process flow, in accordance with an embodiment of the present invention.

FIG. 3 is a block/flow diagram of an exemplary full-dimensional scaling system with process flow 60, in accordance with an embodiment of the present invention.

At node 1, the client 62 sends a request.

At node 2, the front-end 66 initializes resources, such as functional resources 67, which include deployment services 82.

At node 3, the front-end 66 creates an Plan resource 68 for applications.

At node 4, the operator 70 watches the Plan resource 68.

At node 5, the operator 70 sends requests to the planner 72.

At node 6, the planner 72 updates the status from the monitor 74.

At node 7, the planner 72 calls the modeler 76 for resource prediction.

At node 8, the modeler 76 performs predictions.

At node 9, the planner 72 returns scaling results and scheduling results.

At node 10, the operator 70 activates the scaler 80 and the scheduler 78, and updates the Plan status.

At node 11 the scheduler 78 performs scaling on ReplicaSet 88. The scaling resources 84 include both Pods 86 and the ReplicaSet 88.

At node 12, the scheduler 78 performs scheduling by binding Pods 92 and applying istio resources. The scheduling resources 90 include Pod binding 92, as well as virtual services 94 and destination rules 96.

It is noted that nodes 5-12 can run as a periodic reconcile loop.

The front-end 66, the Plan 68, the operator 70, the planner 72, the scheduler 78, and the scaler 80 are part of the Autoscaler 64.

Figure 4:
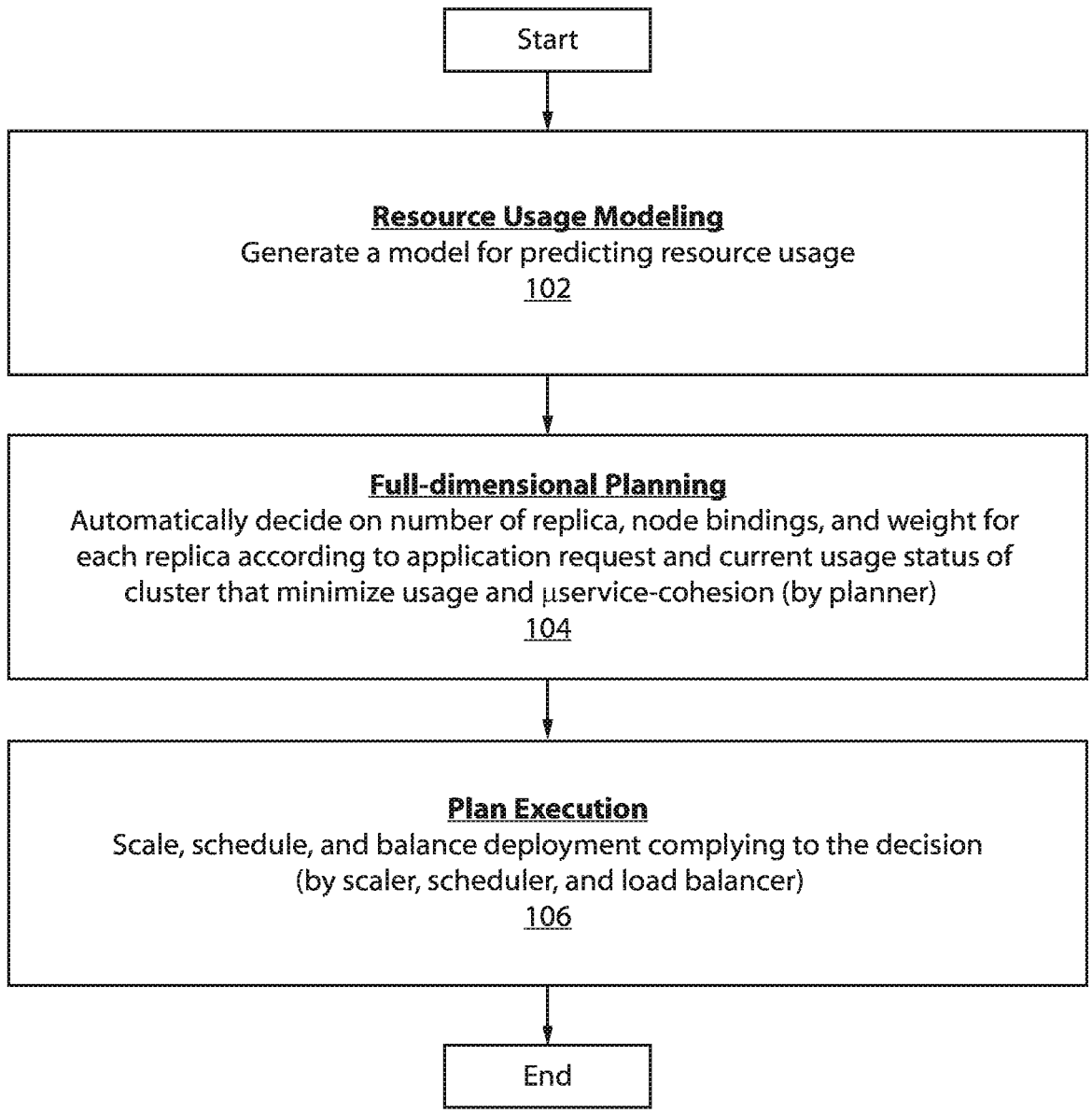
FIG. 4 is a block/flow diagram of an exemplary method for implementing the full-dimensional scaling system, in accordance with an embodiment of the present invention.

FIG. 4 is a block/flow diagram of an exemplary method for implementing the full-dimensional scaling system, in accordance with an embodiment of the present invention.

At block 102, regarding the resource usage modeling, generate a model for predicting resource usage.

At block 104, regarding full-dimensional planning, automatically decide on number of replica, node bindings, and weight for each replica according to application request and current usage status of cluster that minimize usage and μservice-cohesion (by the planner).

At block 106, regarding plan execution, scale, schedule, and balance deployment complying to the decision (by scaler, scheduler, and load balancer).

Figure 5:
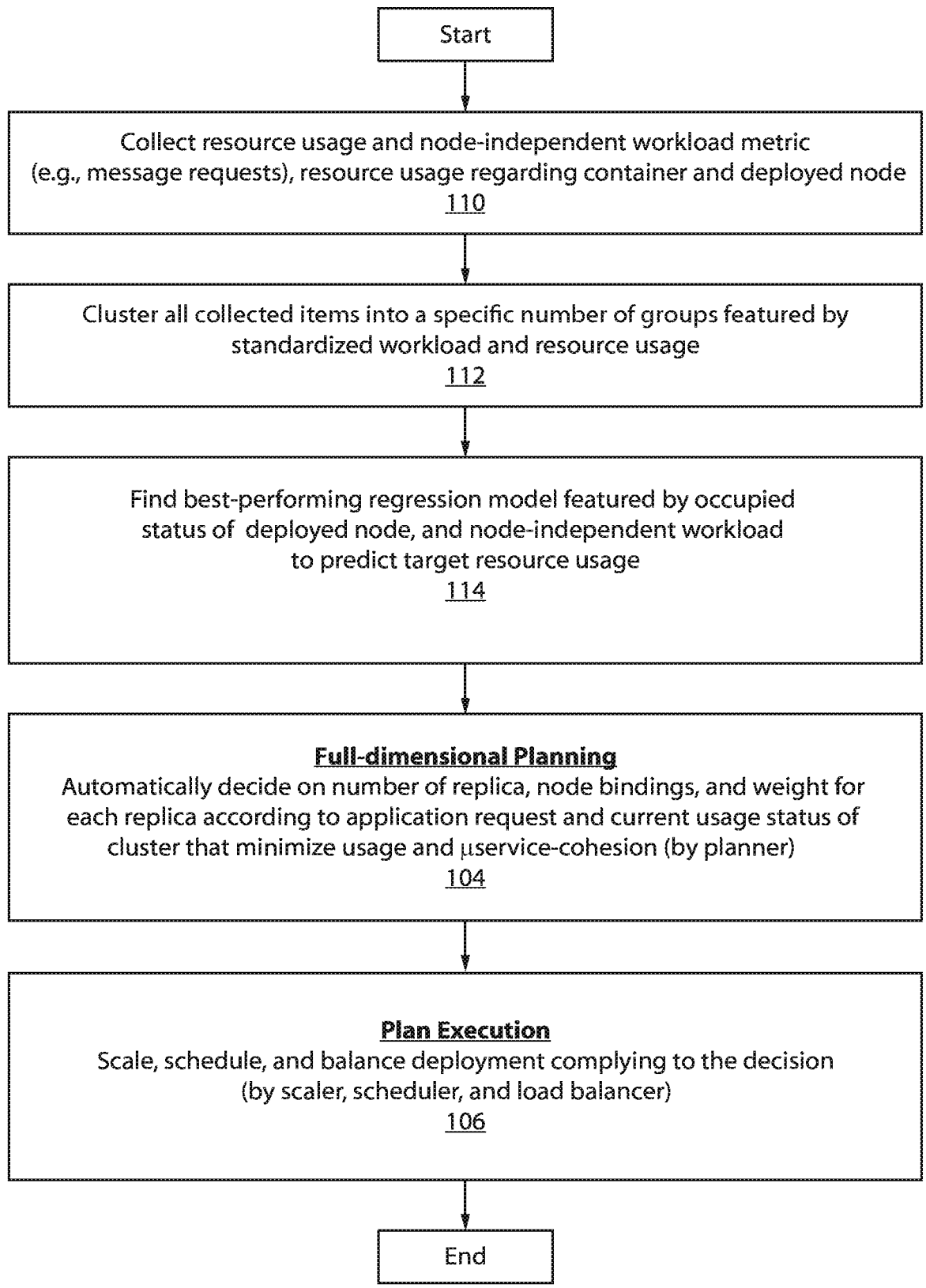
FIG. 5 is a block/flow diagram of an exemplary method for implementing resource usage modeling, in accordance with an embodiment of the present invention.

FIG. 5 is a block/flow diagram of an exemplary method for implementing resource usage modeling, in accordance with an embodiment of the present invention.

Regarding the resource usage modeling:

At block 110, collect resource usage and node-independent workload metric (e.g., message requests), resource usage regarding container and deployed node.

At block 112, cluster all collected items into a specific number of groups featured by standardized workload and resource usage.

At block 114, find the best-performing regression model featured by occupied status of deployed node, and node-independent workload to predict target resource usage for each group.

Resume to the block 104 for full-dimensional planning and to block 106 for plan execution.

Figure 6:
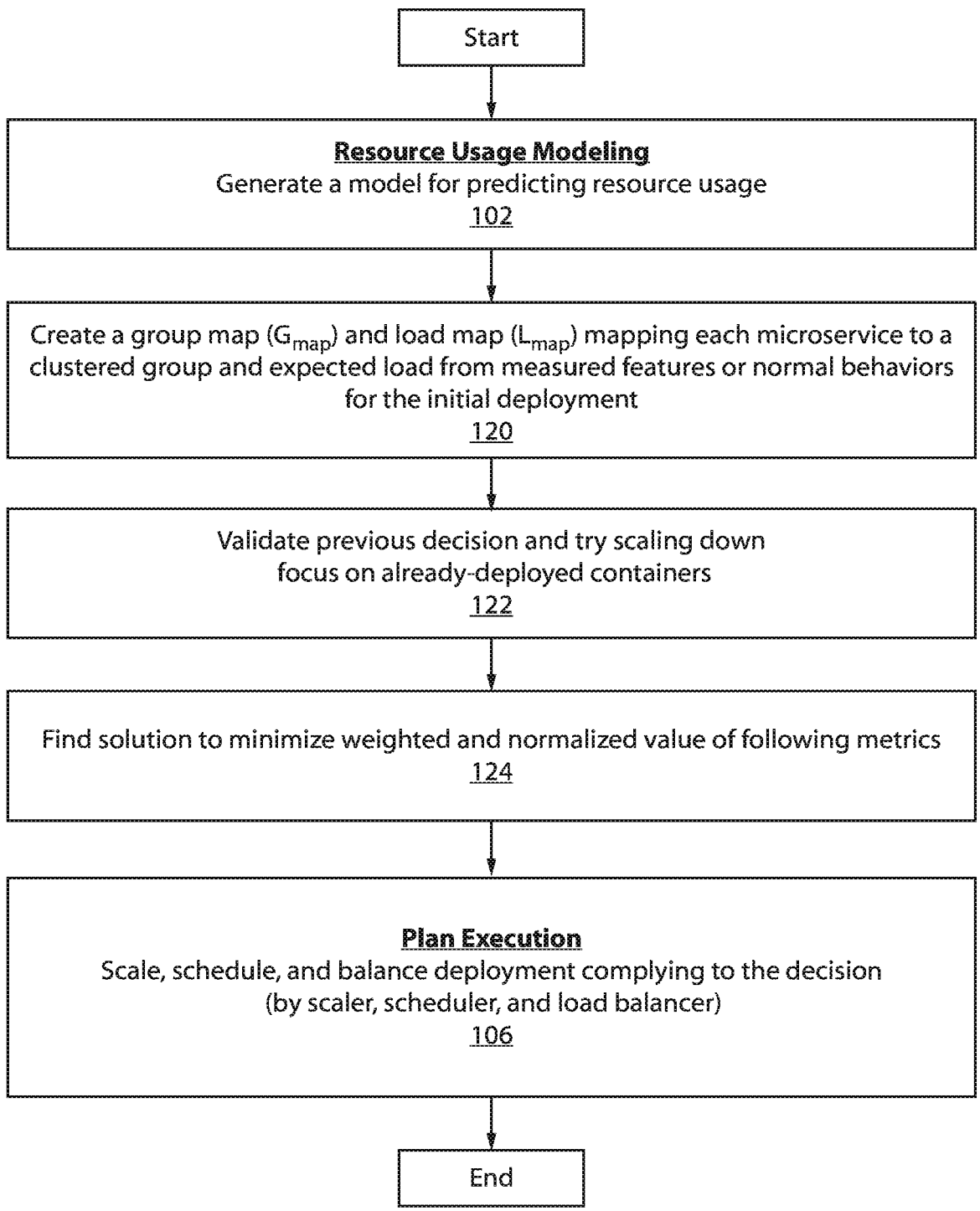
FIG. 6 is a block/flow diagram of an exemplary method for implementing full-dimensional planning, in accordance with an embodiment of the present invention.

FIG. 6 is a block/flow diagram of an exemplary method for implementing full-dimensional planning, in accordance with an embodiment of the present invention.

After resource usage modeling, and regarding full-dimensional planning:

At block 120, create a group map ($G_{map}$) and load map ($L_{map}$) mapping each microservice to a clustered group and expected load from measured features or normal behaviors for the initial deployment.

At block 122, validate previous decision and try scaling down focus on already-deployed containers.

At block 124, find solution to minimize weighted and normalized value of following metrics.

Resume to block 106 for plan execution.

Figure 7:
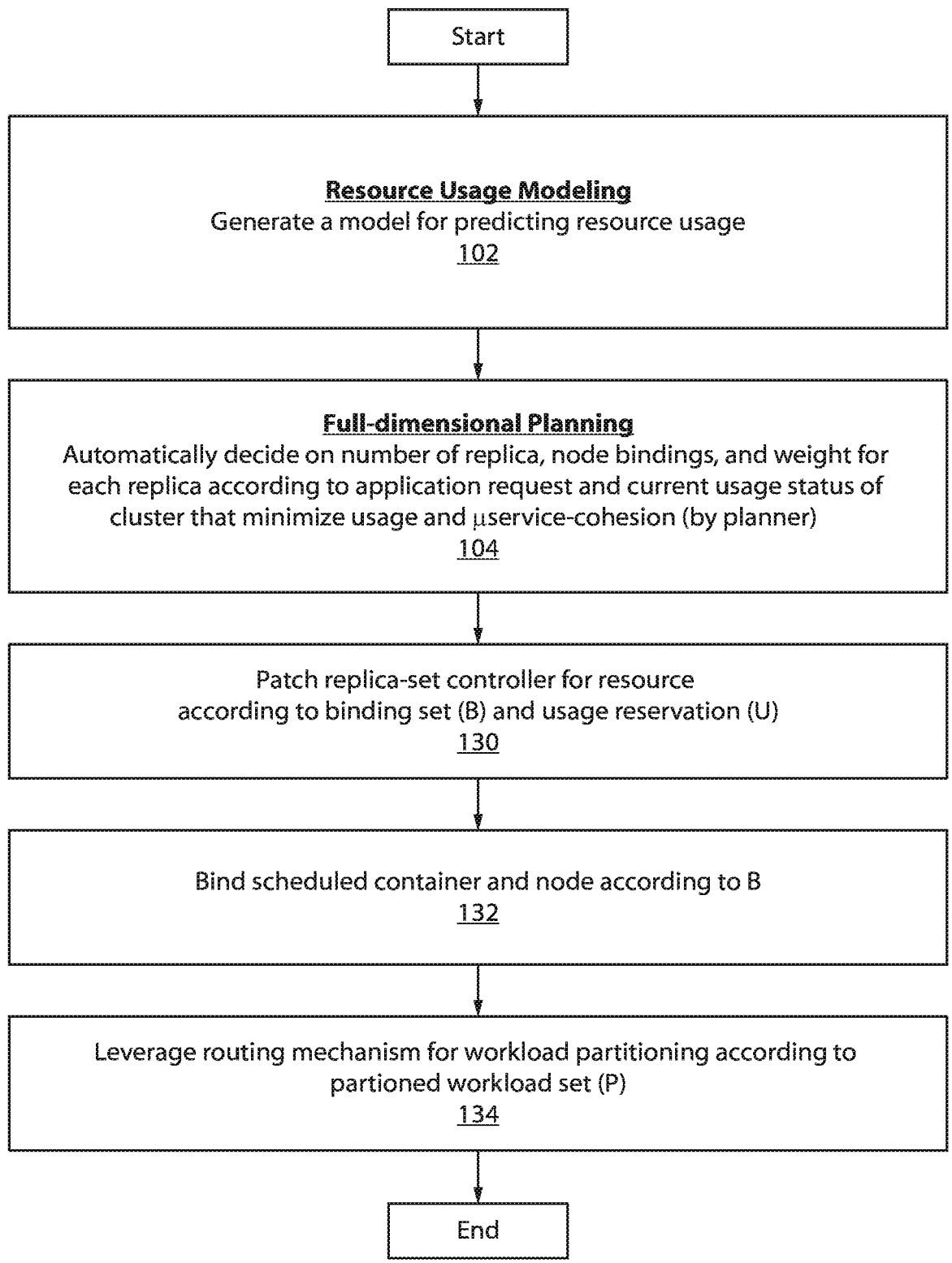
FIG. 7 is a block/flow diagram of an exemplary method for implementing plan execution, in accordance with an embodiment of the present invention.

FIG. 7 is a block/flow diagram of an exemplary method for implementing plan execution, in accordance with an embodiment of the present invention.

After resource usage modeling and full-dimensional planning, regarding plan execution:

At block 130, patch replica-set controller for resource according to binding set (B) and usage reservation (U).

At block 132, bind the scheduled container and node according to B.

At block 134, leverage the routing mechanism for workload partitioning according to partitioned workload set (P).

Figure 8:
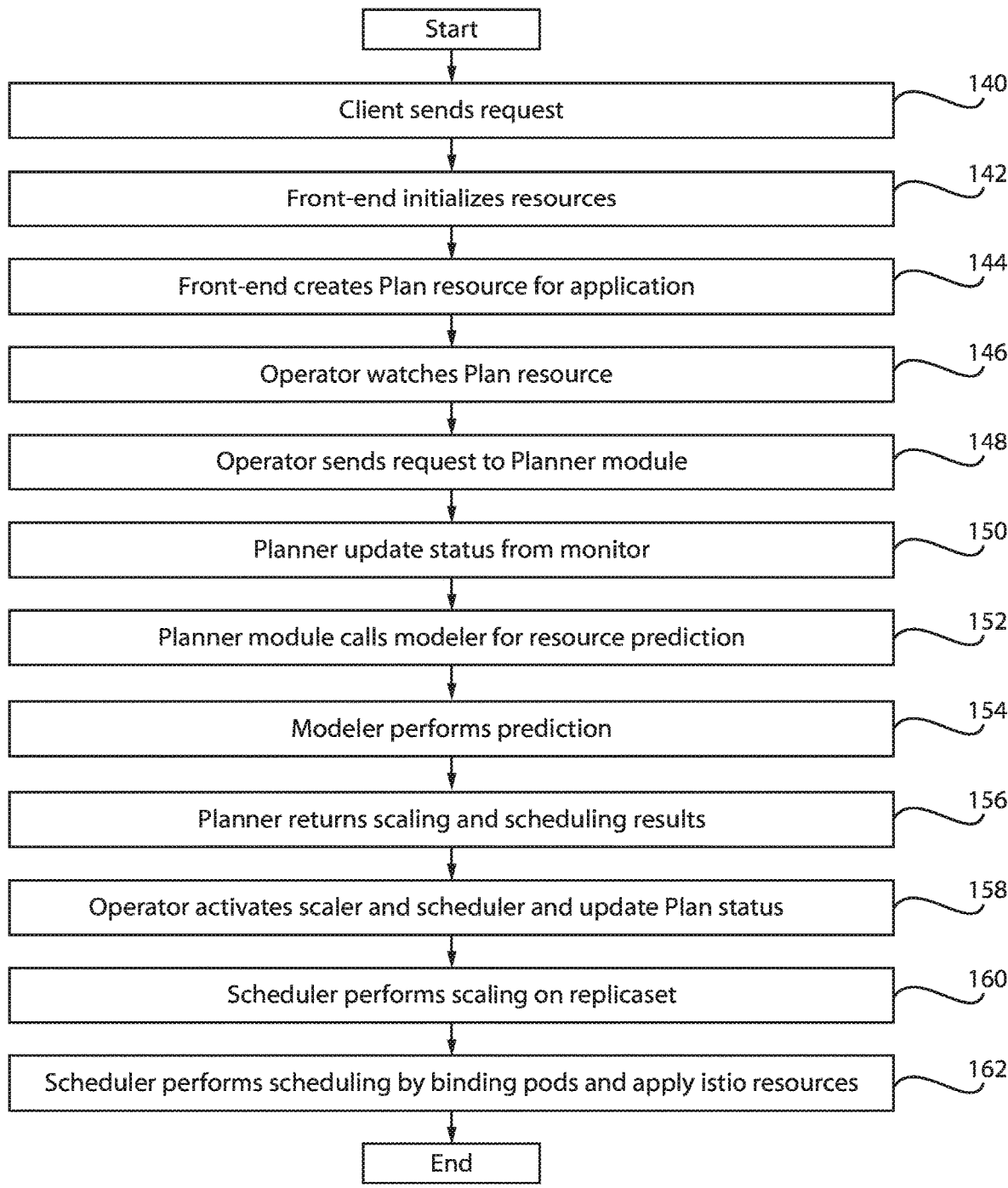
FIG. 8 is a block/flow diagram of an exemplary method for implementing the process flow of FIG. 3, in accordance with an embodiment of the present invention.

FIG. 8 is a block/flow diagram of an exemplary method for implementing the process flow of FIG. 3, in accordance with an embodiment of the present invention.

At block 140, the client sends a request.

At block 142, the front-end initializes resources.

At block 144, the front-end creates Plan resource for application.

At block 146, the operator watches the Plan resource.

At block 148, the operator sends a request to the planner module.

At block 150, the planner updates status from the monitor.

At block 152, the planner module calls the modeler for resource prediction.

At block 154, the modeler performs a prediction.

At block 156, the planner returns scaling and scheduling results.

At block 158, the operator activates the scaler and scheduler, and updates the Plan status.

At block 160, the scheduler performs scaling on ReplicaSet.

At block 162, the scheduler performs scheduling by binding Pods and applies istio resources.

Therefore, the present invention provides methods and systems to provide automatic scaling of microservices based on projected demand. While the present invention is discussed in the context of microservices, it is understood that the present invention may also or alternatively be applied to applications themselves or any other unit of software that may utilize the scaling of computing resources. In some systems, the microservices that make up an application are implemented such that as demand for a particular microservice increases, the resources allocated to that microservice are also increased. Likewise, as the demand for a particular microservice decreases, the resources allocated to that microservice also decrease. This system provides improved resource management and allows for better efficiencies on both the server side and the client side.

In summary, a method for scheduling and scaling a cloud system for μservice applications is presented. Additionally, a system is presented for scheduling and scaling a cloud system for μservice applications, the system having a planner and a modeler, the modeler including a clustering model and a prediction model, wherein the clustering model classifies a μservice application into a group which includes similar function applications based on stats of workload and stats of resource usage, and the prediction model makes predictions of resource usage for each group classified by the clustering model based on workload and a node's occupied status. The method includes repeating the following steps to predict replicas, node to bind, and weight for each replica meeting conditions that resource usage is not over node capacity, resource usage is almost minimum, and communication between nodes is almost minimum (e.g., max cohesion). The steps include sending replicas, node to bind, and weight for each replica to the modeler, monitoring collected metrics (e.g., CPU/Memory usage, the number of replicas, etc.), computing stats of workload and stats of resource usage of given replicas by using the collected metrics, clustering replicas to the each group with the clustering model by the computed stats, predicting resource usage of the group by using workload and occupied status of nodes to bind, making decisions by predicting replicas, node to bind and weight for each replica, scaling the system, by the scaler, scheduling the system, by the scheduler, and partitioning load, by the partitioner, to comply to the decision.

Figure 9:
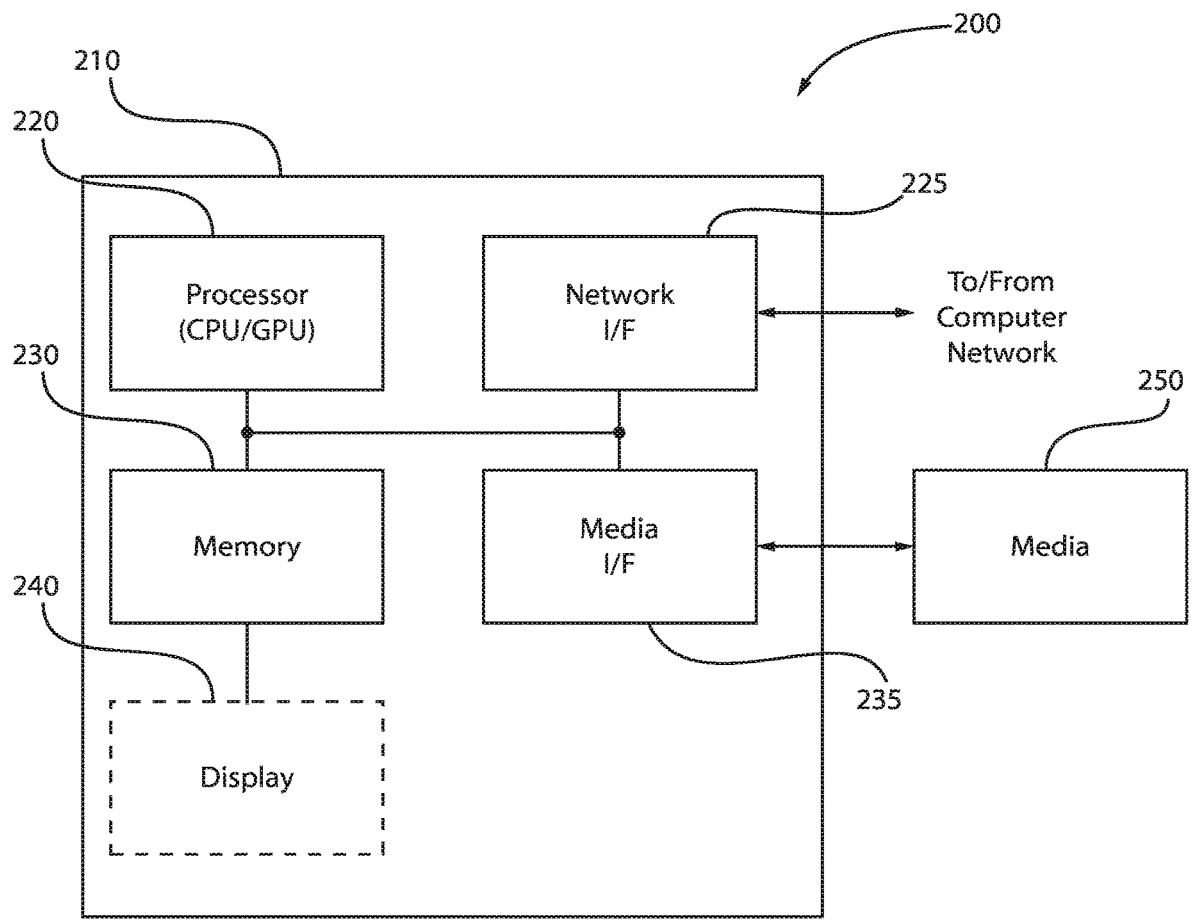
FIG. 9 is a block/flow diagram of an exemplary processing system employing the full-dimensional scaling system process flow, in accordance with an embodiment of the present invention.

FIG. 9 is a block/flow diagram of an exemplary processing system employing the full-dimensional scaling system process flow, in accordance with an embodiment of the present invention.

A block diagram is shown of an apparatus 200 for implementing one or more of the methodologies presented herein.

Apparatus 200 includes a computer system 210 and removable media 250. Computer system 210 includes a CPU device and a GPU device collectively referred to as 220, a network interface 225, a memory 230, a media interface 235 and an optional display 240. Network interface 225 allows computer system 210 to connect to a network, while media interface 235 allows computer system 210 to interact with media, such as a hard drive or removable media 250.

CPU/GPU 220 can be configured to implement the methods, steps, and functions disclosed herein. The memory 230 could be distributed or local and the processor CPU/GPU 220 could be distributed or singular. The memory 230 could be implemented as an electrical, magnetic or optical memory, or any combination of these or other types of storage devices. Moreover, the term "memory" should be construed broadly enough to encompass any information able to be read from, or written to, an address in the addressable space accessed by CPU/GPU 220. With this definition, information on a network, accessible through network interface 225, is still within memory 230 because the processor device 220 can retrieve the information from the network. It should be noted that each distributed processor that makes up CPU/GPU 220 generally includes its own addressable memory space. It should also be noted that some or all of computer system 210 can be incorporated into an application-specific or general-use integrated circuit.

Optional display 240 is any type of display suitable for interacting with a human user of apparatus 200. Generally, display 240 is a computer monitor or other similar display.

Figure 10:
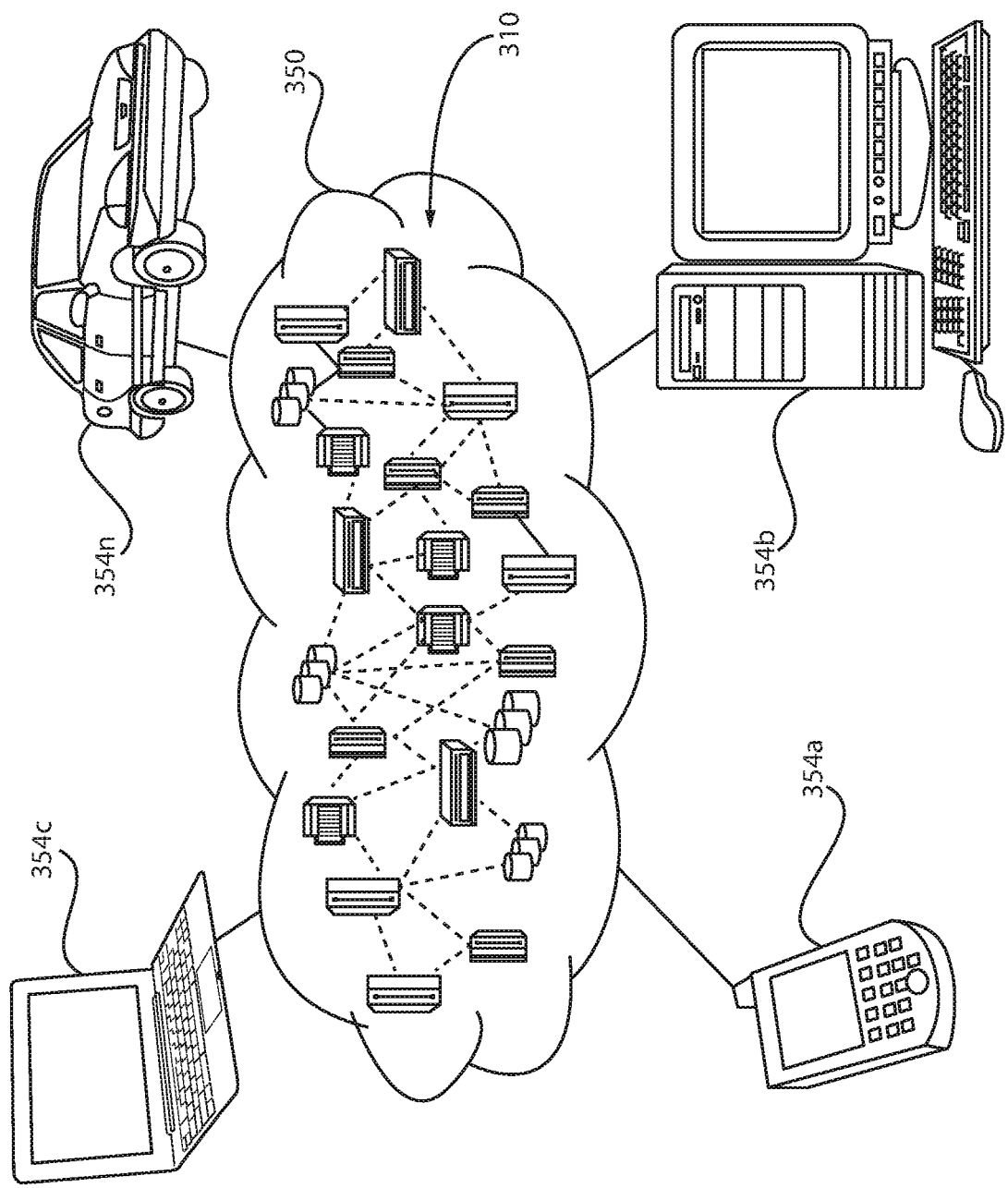
FIG. 10 is a block/flow diagram of an exemplary cloud computing environment, in accordance with an embodiment of the present invention.

FIG. 10 is a block/flow diagram of an exemplary cloud computing environment, in accordance with an embodiment of the present invention.

It is to be understood that although this invention includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model can include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but can be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It can be managed by the organization or a third party and can exist on-premises or off-premises.

Community cloud: the cloud infrastructure is shared by several organizations and supports a specific community that has shared concerns (e.g., mission, security requirements, policy, and compliance considerations). It can be managed by the organizations or a third party and can exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 10, illustrative cloud computing environment 350 is depicted for enabling use cases of the present invention. As shown, cloud computing environment 350 includes one or more cloud computing nodes 310 with which local computing devices used by cloud consumers, such as, for example, personal digital assistant (PDA) or cellular telephone 354A, desktop computer 354B, laptop computer 354C, and/or automobile computer system 354N can communicate. Nodes 310 can communicate with one another. They can be grouped (not shown) physically or virtually, in one or more networks, such as Private, Community, Public, or Hybrid clouds as described hereinabove, or a combination thereof. This allows cloud computing environment 350 to offer infrastructure, platforms and/or software as services for which a cloud consumer does not need to maintain resources on a local computing device. It is understood that the types of computing devices 354A-N shown in FIG. 10 are intended to be illustrative only and that computing nodes 310 and cloud computing environment 350 can communicate with any type of computerized device over any type of network and/or network addressable connection (e.g., using a web browser).

Figure 11:
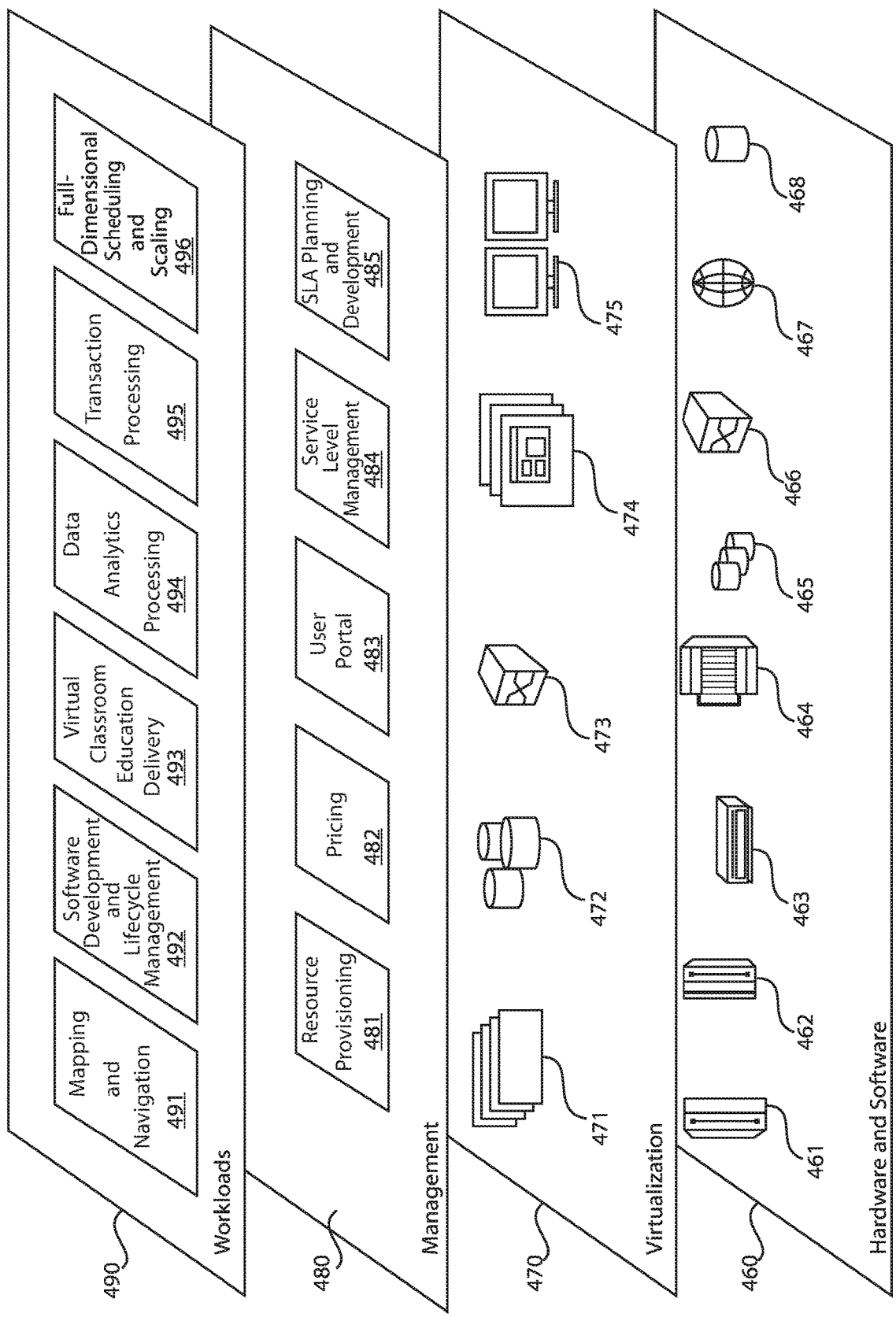
FIG. 11 is a schematic diagram of exemplary abstraction model layers, in accordance with an embodiment of the present invention.

FIG. 11 is a schematic diagram of exemplary abstraction model layers, in accordance with an embodiment of the present invention. It should be understood in advance that the components, layers, and functions shown in FIG. 11 are intended to be illustrative only and embodiments of the invention are not limited thereto. As depicted, the following layers and corresponding functions are provided:

Hardware and software layer 460 includes hardware and software components. Examples of hardware components include: mainframes 461; RISC (Reduced Instruction Set Computer) architecture based servers 462; servers 463; blade servers 464; storage devices 465; and networks and networking components 466. In some embodiments, software components include network application server software 467 and database software 468.

Virtualization layer 470 provides an abstraction layer from which the following examples of virtual entities can be provided: virtual servers 471; virtual storage 472; virtual networks 473, including virtual private networks; virtual applications and operating systems 474; and virtual clients 475.

In one example, management layer 480 can provide the functions described below. Resource provisioning 481 provides dynamic procurement of computing resources and other resources that are utilized to perform tasks within the cloud computing environment. Metering and Pricing 482 provide cost tracking as resources are utilized within the cloud computing environment, and billing or invoicing for consumption of these resources. In one example, these resources can include application software licenses. Security provides identity verification for cloud consumers and tasks, as well as protection for data and other resources. User portal 483 provides access to the cloud computing environment for consumers and system administrators. Service level management 484 provides cloud computing resource allocation and management such that required service levels are met. Service Level Agreement (SLA) planning and fulfillment 485 provide pre-arrangement for, and procurement of, cloud computing resources for which a future requirement is anticipated in accordance with an SLA.

Workloads layer 490 provides examples of functionality for which the cloud computing environment can be utilized. Examples of workloads and functions which can be provided from this layer include: mapping and navigation 441; software development and lifecycle management 492; virtual classroom education delivery 493; data analytics processing 494; transaction processing 495; and full-dimensional scaling and scheduling system for μservices 496.

The present invention can be a system, a method, and/or a computer program product. The computer program product can include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory, a read-only memory, an erasable programmable read-only memory (EPROM or Flash memory), a static random access memory, a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can include copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention can be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer readable program instructions by utilizing state information of the computer readable program instructions to personalize the electronic circuitry, to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions can be provided to at least one processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks or modules. These computer readable program instructions can also be stored in a computer readable storage medium that can direct a computer, a programmable data processing apparatus, and/or other devices to function in a particular manner, such that the computer readable storage medium having instructions stored therein includes an article of manufacture including instructions which implement aspects of the function/act specified in the flowchart and/or block diagram block or blocks or modules.

The computer readable program instructions can also be loaded onto a computer, other programmable data processing apparatus, or other device to cause a series of operational blocks/steps to be performed on the computer, other programmable apparatus or other device to produce a computer implemented process, such that the instructions which execute on the computer, other programmable apparatus, or other device implement the functions/acts specified in the flowchart and/or block diagram block or blocks or modules.

The flowchart and block diagrams in the Figures illustrate the architecture, functionality, and operation of possible implementations of systems, methods, and computer program products according to various embodiments of the present invention. In this regard, each block in the flowchart or block diagrams can represent a module, segment, or portion of instructions, which includes one or more executable instructions for implementing the specified logical function(s). In some alternative implementations, the functions noted in the blocks can occur out of the order noted in the figures. For example, two blocks shown in succession can, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Reference in the specification to "one embodiment" or "an embodiment" of the present principles, as well as other variations thereof, means that a particular feature, structure, characteristic, and so forth described in connection with the embodiment is included in at least one embodiment of the present principles. Thus, the appearances of the phrase "in one embodiment" or "in an embodiment", as well any other variations, appearing in various places throughout the specification are not necessarily all referring to the same embodiment.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This can be extended, as readily apparent by one of ordinary skill in this and related arts, for as many items listed.

Having described preferred embodiments of a method for full-dimensional scheduling and scaling for µservice applications (which are intended to be illustrative and not limiting), it is noted that modifications and variations can be made by persons skilled in the art in light of the above teachings. It is therefore to be understood that changes may be made in the particular embodiments described which are within the scope of the invention as outlined by the appended claims. Having thus described aspects of the invention, with the details and particularity required by the patent laws, what is claimed and desired protected by Letters Patent is set forth in the appended claims.

The invention claimed is:

1. A computer-implemented method for scheduling and scaling a cloud system for microservice applications, the method comprising:
   identifying a plurality of nodes within one or more clusters associated with a plurality of containers;
   generating a model for predicting resource usage among the plurality of nodes;
   automatically deciding on a number of replicated containers, node bindings, and weight for each replicated container according to application requests and current usage status of a cluster of the one or more clusters that reduce resource usages and microservice cohesion; and
   determining at least node redistribution of the plurality of nodes within the plurality of containers and workload partitioning to reconfigure scaling, scheduling, and balance deployment requirements of the microservice applications.

2. The computer-implemented method of claim 1, wherein the generated model is a clustering model to cluster arbitrary containers of the plurality of containers into predefined groups based on container behaviors related to workload metrics and the resource usage among the plurality of nodes.

3. The computer-implemented method of claim 2, wherein, for each cluster of the one or more clusters, build a regression model to predict the resource usage from node-independent loads and occupied status of deployed nodes of the plurality of nodes.

4. The computer-implemented method of claim 1, further comprising creating a group map and a load map to map each microservice of the microservice applications to a clustered group and expected load from measured features.

5. The computer-implemented method of claim 1, further comprising validating a previous deployment decision by sorting and migrating the microservice of the microservice applications from a workload minimum order to a deployed node with maximum workload until a threshold is reached for a node capacity constraint.

6. The computer-implemented method of claim 1, further comprising validating a previous deployment decision by re-predicting resource usage for every new binding set.

7. The computer-implemented method of claim 1, further comprising validating a previous deployment decision by pre-setting a valid and merged solution to update a most demanding microservice of the microservice applications.

8. The computer-implemented method of claim 1, further comprising minimizing a weighted and normalized value based on a number of replicated containers.

9. The computer-implemented method of claim 1, further comprising minimizing a weighted and normalized value based on the microservice cohesion.

10. The computer-implemented method of claim 9, wherein the microservice cohesion is defined as a service dependency weight between each microservice pair on a same node in a binding set multiplied by a partitioned workload.

11. A computer program product for scheduling and scaling a cloud system for microservice applications, the computer program product comprising a computer readable storage medium having program instructions embodied therewith, the program instructions executable by a computer to cause the computer to:
   identify a plurality of nodes within one or more clusters associated with a plurality of containers;
   generate a model for predicting resource usage among the plurality of nodes;
   automatically decide on a number of replicated containers, node bindings, and weight for each replicated container according to application requests and current usage status of a cluster of the one or more clusters that reduce resource usages and microservice cohesion; and
   determine at least node redistribution of the plurality of nodes within the plurality of containers and workload partitioning to reconfigure scaling, scheduling, and balance deployment requirements of the microservice applications.

12. The computer program product of claim 11, wherein the generated model is a clustering model to cluster arbitrary containers of the plurality of containers into predefined groups based on container behaviors related to workload metrics and the resource usage among the plurality of nodes.

13. The computer program product of claim 12, wherein, for each cluster of the one or more clusters, build a regression model to predict the resource usage from node-independent loads and occupied status of deployed nodes of the plurality of nodes.

14. The computer program product of claim 11, wherein a group map and a load map are created to map each microservice of the microservice applications to a clustered group and expected load from measured features.

15. The computer program product of claim 11, wherein a previous deployment decision is validated by sorting and migrating the microservice of the microservice applications from a workload minimum order to a deployed node with maximum workload until a threshold is reached for a node capacity constraint.

16. The computer program product of claim 11, wherein a previous deployment decision is validated by re-predicting resource usage for every new binding set.

17. The computer program product of claim 11, wherein a previous deployment decision is validated by pre-setting a valid and merged solution to update a most demanding microservice of the microservice applications.

18. The computer program product of claim 11, wherein a weighted and normalized value is minimized based on a number of replicated containers.

19. The computer program product of claim 11, wherein a weighted and normalized value is minimized based on the microservice cohesion.

20. A system for scheduling and scaling a cloud system for microservice applications, comprising:
a memory; and
one or more processors in communication with the memory configured to:
identify a plurality of nodes within one or more clusters associated with a plurality of containers;
generate a model for predicting resource usage among the plurality of nodes;
automatically decide on a number of replicated containers, node bindings, and weight for each replicated container according to application requests and current usage status of a cluster of the one or more clusters that reduce resource usages and microservice cohesion; and
determine at least node redistribution of the plurality of nodes within the plurality of containers and workload partitioning to reconfigure scaling, scheduling, and balance deployment requirements of the microservice applications.

* * * * *